(12) United States Patent
Sinquin et al.

(10) Patent No.: US 6,417,417 B1
(45) Date of Patent: Jul. 9, 2002

(54) ADDITIVE FORMULATION FOR IMPROVING TRANSPORT OF OILFIELD EFFLUENTS WHICH MAY CONTAIN HYDRATES, AND A PROCESS USING THIS FORMULATION

(75) Inventors: Anne Sinquin, Nanterre; Marie Velly, Montesson; Béatrice Cingotti, Antony; Jean-Pierre Durand, Chatou, all of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/560,138

(22) Filed: Apr. 28, 2000

(30) Foreign Application Priority Data

Apr. 29, 1999 (FR) .............................. 99 05589

(51) Int. Cl.[7] .............................. C07C 9/00; C07C 7/20
(52) U.S. Cl. .......................... 585/15; 585/950; 95/153; 507/90; 137/3; 137/13
(58) Field of Search ..................... 585/15, 950; 95/153; 137/3, 13; 507/90

(56) References Cited

U.S. PATENT DOCUMENTS

| | | | | |
|---|---|---|---|---|
| 5,244,878 A | * | 9/1993 | Sugier et al. | 585/15 |
| 5,426,258 A | * | 6/1995 | Thomas et al. | 585/15 |
| 5,434,323 A | * | 7/1995 | Durand et al. | 585/15 |
| H1749 H | * | 9/1998 | Colle et al. | 585/15 |
| 5,958,844 A | * | 9/1999 | Sinquin et al. | 585/15 |
| 5,981,816 A | * | 11/1999 | Sinquin et al. | 585/15 |
| 6,015,929 A | * | 1/2000 | Rabeony et al. | 585/15 |
| 6,093,862 A | * | 7/2000 | Sinquin et al. | 585/15 |
| 6,093,863 A | * | 7/2000 | Cohen et al. | 585/15 |
| 6,107,531 A | * | 8/2000 | Colle et al. | 585/15 |
| 6,251,836 B1 | * | 6/2001 | Duncum et al. | 585/15 |

FOREIGN PATENT DOCUMENTS

| | | |
|---|---|---|
| EP | 0 309 210 A1 | 3/1989 |
| WO | WO 96/08456 A1 | 3/1996 |

* cited by examiner

Primary Examiner—Jacqueline V. Howard
(74) Attorney, Agent, or Firm—Millen, White, Zelano & Branigan, P.C.

(57) ABSTRACT

In order to improve the transport of oilfield effluents comprising water, a gas and possibly a liquid hydrocarbon phase under thermodynamic conditions which can lead to the formation of hydrates, a formulation containing at least two additives, one of which behaves as a hydrate crystal nucleation agent, is added to the effluent to be transported.

45 Claims, No Drawings

ADDITIVE FORMULATION FOR IMPROVING TRANSPORT OF OILFIELD EFFLUENTS WHICH MAY CONTAIN HYDRATES, AND A PROCESS USING THIS FORMULATION

BACKGROUND OF THE INVENTION

FIELD OF THE INVENTION

The invention relates to additive formulations for improving the transport of oilfield effluents in which hydrates of natural gas, petroleum gas or other gases can form. It also relates to a process using such a formulation.

Gases which form hydrates can comprise at least one hydrocarbon selected from methane, ethane, ethylene, propane, propene, n-butane and iso-butane, and possibly $H_2S$ and/or $CO_2$.

Such hydrates form when water is found in the presence of gas, either in a free state or dissolved in a liquid phase such as a liquid hydrocarbon, and when the temperature reached by the mixture, in particular water, gas and possibly liquid hydrocarbons such as oil, drops below the thermodynamic hydrate formation temperature, that temperature being given for a known composition of gases at a fixed pressure.

Hydrate formation is feared in particular in the gas and oilwell industry where hydrate formation conditions can be satisfied. In order to reduce the production costs of crude oil and gas, both as regards investment and exploitation, one route, particularly for offshore production, is to reduce or even do away with treatments carried out on the crude or the gas to be transported from the field to the coast and in particular to leave all or part of the water in the fluid to be transported. Offshore treatments are generally carried out on a platform located on the surface near the field, such that the effluent, which is initially hot, can be treated before the thermodynamic hydrate formation conditions are satisfied when seawater cools the effluent.

However in practice, when the thermodynamic conditions required for hydrate formation are satisfied, hydrate agglomeration causes the transport conduits to block by the formation of plugs which prevent the passage of any crude oil or gas.

Hydrate plug formation can cause a production stoppage and thus result in substantial financial losses. Further, restarting the installation, especially when it involves offshore production or transport, can be a long process, as it is difficult to decompose the hydrates which have formed. When the production from an undersea natural gas or crude oil and gas field comprising water reaches the surface of the sea bed and is then transported along the sea bottom, the reduction in the temperature of the effluent produced can mean that the thermodynamic conditions for hydrates to form are satisfied and they form, agglomerate and block the transfer conduits. The sea bottom temperature can, for example, be 3° C. or 4° C.

Favorable conditions for hydrate formation can also be satisfied onshore when conduits are not buried (or are not buried deeply) in the soil, for example when the ambient air temperature is sufficiently low.

DESCRIPTION OF THE PRIOR ART

In order to overcome these disadvantages, prior authors have sought products which when added to a fluid can act as inhibitors by reducing the thermodynamic hydrate formation temperature. They are mainly alcohols, such as methanol, or glycols such as mono-, di- or tri-ethylene glycol. However, to be efficient, such products must be used in large quantities (10% to 40% of the amount of water), bringing with it two major disadvantages: high production costs and major pollution problems.

Insulation of the transport conduits has also been recommended, to prevent the temperature of the transported fluid from reaching the hydrate formation temperature under the operating conditions. However, this technique is also very expensive.

Two products based on using low quantities of additives (less than 1% by weight with respect to the water) have also been proposed.

The first process uses surfactants, preferably polymers, which disperse the hydrates to transport the hydrates in the form of a suspension in the effluent under consideration. Such a process has been described widely and in particular by the Applicant in previous patents, for example in European Patents Nos. 323 774 and 323 775.

The second process is based on adding water-soluble additives (known as kinetic inhibitors) which can modify hydrate crystallization (germination/growth/agglomeration) so that the transport time for effluents in the conduits is less than the time preceding hydrate formation or the time taken by the hydrates to grow and/or agglomerate to form a plug. Prior art kinetic inhibitors used in such a process are water-soluble polymers or copolymers which substantially prolong the hydrate formation time and substantially reduce the growth rate of the hydrate crystals. Such kinetic inhibitors, used alone or as a mixture, have been described in International Patent applications WO 94/12761, 96/04462, 96/29501 and 97/13824; and U.S. Pat. Nos. 5,723,524 and 5,744,665.

While they can substantially retard hydrate formation, such additives nevertheless suffer from the enormous disadvantage of leading to uncontrolled hydrate formation when the limits of use of such additives are breached.

SUMMARY OF THE INVENTION

We have now discovered a water-soluble additive formulation which can improve the transport of oilfield effluents comprising water, a gas and possibly a liquid hydrocarbon phase under thermodynamic conditions which are likely to lead to hydrate formation, this additive formulation being characterized in that it can better control hydrate formation by creating a very large number of small crystals and avoiding the disadvantage cited above and difficult to foresee from prior art kinetic inhibitor formulations.

Thus the present invention provides an additive formulation and a process for improving hydrate transport in a fluid comprising water, a gas and possibly a liquid hydrocarbon phase, under conditions in which hydrates can form from water and a gas, characterized in that said additive formation is incorporated into said fluid before hydrate formation, said additive formulation comprising at least two additives at least one of which behaves as a hydrate crystal nucleation agent.

DESCRIPTION OF THE PREFERRED EMBODIMENTS

In the formulations of the present invention, the nucleation agent(s) is (are) generally associated with one or more additives which can control the growth of hydrate crystals (growth inhibitors) and optionally one or more additives which can control their agglomeration (dispersing agents).

One preferred implementation of the invention consists of combining the nucleation agent with both a growth inhibitor and a hydrate crystal-dispersing agent. Such a formulation enables many nuclei to form; the growth and agglomeration of which are greatly retarded and the characteristics of which are such that they do not perturb transport of the fluid containing them.

The nucleation agents present in the formulations of the invention can be any water-soluble compound which can reduce the hydrate formation time. More particularly, it can be a water-soluble compound possessing one or more hydroxyl groups, such as alcohols or polyols. It may also be a water-soluble polymer containing one or more hydroxyl groups per monomer unit or a copolymer wherein at least one of the monomers constituting them possesses one or more hydroxyl groups. Examples which can be cited are polyvinyl alcohol, partially hydrolyzed poly (vinyl acetate), polyglycerols, alkylene glycol poly(meth)acrylates or poly methyl(meth)acrylates rendered water-soluble by aminolysis. The molecular mass of such polymers and copolymers are preferably relatively low, for example less than 50,000 and, in a preferred mode of the invention, less than 1,000. The nucleation agents also include quaternary phosphonium salts.

It should be noted that certain of these nucleation agents used in high concentration, for example over 10% by weight with respect to the water, behave as thermodynamic inhibitors. Further, certain polymer or copolymer type nucleation agents of the present invention can lose their specific nucleation agent characteristic if their molecular mass is too high.

A second constituent which can be present in the additive formulations of the invention can consist of a growth inhibitor. It can be any water-soluble polymer compound which can reduce the gas hydrate growth rate. It may, for example, be a polymeric compound already described in some of the Applicant's patents, such as associative water-soluble copolymers described in U.S. Pat. No. 5,817,898 or water-soluble copolymers containing no heterocycle but containing at least one sulfonate group described in U.S. Pat. No. 5,789,635 or cationic polymers and copolymers described in French Patent No. 2 748 773. The molecular mass of growth inhibitors used in the formulation of the invention will be relatively high, preferably more than 50,000.

A third constituent which may be present in the additive formulations of the invention can consist of a dispersing agent which can prevent agglomeration of the hydrate crystals once they have formed. As an example, it can be selected from non-ionic, anionic, cationic or amphoteric compounds. Such low molecular weight compounds, for example less than 10,000, preferably 5000, will have a hydrophilic-lipophilic balance (HLB) such that they will be soluble or at least dispersible in water. Dispersing additives which can be used as the third constituent in formulations of the invention include compositions which a non-ionic amphiphilic nature such as polyethylene glycol polyisobutenylsuccinates.

It is also possible to cite compositions with a non-ionic amphiphilic nature obtained by reacting at least one unsaturated vegetable oil polymerized with an aminoalcohol. The aminoalcohol can be monoethanolamine or diethanolamine. Such compositions have been described by the Applicant, in particular in European Patent application No. 905 125. The use of these compositions as a hydrate dispersing additives has been described in European Patent application No. 905 350. The descriptions of these patent documents are hereby incorporated into the present description by reference.

Preferred additive formulations of the invention contain both at least one nucleation agent, at least one growth inhibitor and at least one hydrate crystal dispersing agent, each in a proportion of 5% to 50%, for example.

The process of the invention is aimed at improving the transport of an oilfield effluent comprising water, a gas and possibly a liquid hydrocarbon phase under thermodynamic conditions where hydrates can form from the water and the gas, comprising incorporating an additive formulation as described above into said effluent.

The additive formulation of the invention is generally added to an oilfield effluent to be treated in a concentration of 0.05% to 5% by weight, preferably 0.2% to 2% by weight, with respect to the water content of said effluent.

More particularly, the nucleation agent content introduced is at most 2% by weight, preferably at most 0.5% by weight, the amount of growth inhibitor is at most 2% by weight, preferably at most 1% by weight, and the amount of dispersing agent is at most 1% by weight, preferably at most 0.5% by weight with respect to the water present in the oilfield effluent to be treated.

The entire disclosure of all applications, patents and publications, cited above and below, and of corresponding French application 99/05 589, filed Apr. 29, 1999, are hereby incorporated by reference.

EXAMPLES

The following examples illustrate the invention but should not in any way be considered to be limiting. Examples 1, 2 and 3 are given by way of comparison.

In these examples, in order to test the effectiveness of the products used in the process of the invention (by comparison with reference additives) in the presence of methane hydrates, tests for forming hydrates from gas and condensate and water were carried out using the apparatus described below.

The apparatus comprised a 10 meter loop constituted by 7.7 mm diameter tubes, a 2 liter reactor comprising an inlet and an outlet for gas, and an intake and a discharge for the water and additive initially introduced. The reactor enabled the loop to be pressurized. Tubes with an analogous diameter to those of the loop allowed the fluid to circulate from the loop to the reactor and vice versa, by means of a gear pump placed between the two. A sapphire cell integrated into the circuit enabled the circulating liquid to be observed as well as the hydrates when they formed.

In order to determine the effectiveness of the additives of the invention, the fluid (water and condensate or an aqueous solution of additive and condensate) was introduced into the reactor. The apparatus was then pressurized to 7 MPa. The solution was homogenized by circulating it in the loop and reactor for one hour at 20° C. The pressure was kept constant by adding methane, and the temperature was gradually reduced (0.5° C./min) from 20° C. to 3° C., corresponding to the selected experimental temperature.

The principle of these tests was to determine the temperature at which the methane hydrates were formed in the loop and to evaluate the rate of growth and the quantity of hydrate crystals formed. Hydrate formation was detected by a release of heat and an increase in gas consumption.

Example 1 (comparative)

In the absence of additive (medium: deionized water and condensate—30/70 volume %), the methane hydrates formed at a temperature close to 10.8° C. From the formation of the first crystals, two phases were observed regarding gas consumption. In the first phase (about 5 minutes), gas addition was very small, indicating that a certain number of hydrate seeds had formed in the system. These seeds were in a slow growth phase and seeded the medium. In the second phase, the gas consumption became extremely high (maximum opening of flow meter) until complete blockage of the fluid circulation in the reactor and loop assembly. The second phase corresponded to explosive growth of the crystals formed in the first phase and to their agglomeration, finally forming a plug in the conduit. This phase lasted 28 minutes and the total consumption was 17 normal liters on average.

Example 2 (comparative)

Example 1 was repeated, with the exception that 0.3% by weight of a kinetic hydrate formation inhibitor, a product sold under the trade name VC-713 and representing current commercial additives, was added to the water, and hydrate formation was observed at 3.3° C. Regarding gas consumption, the first phase was non-existent and the second phase remained equivalent to that of the "water without additive+condensate" mixture described in Example 1 (flow meter opening at a maximum). In this example, formation of the first hydrate nuclei was immediately accompanied by an extremely rapid growth thereof, as the driving force of the system was very high and as a result the first slow consumption phase disappeared. This behavior indicates clearly that when the kinetic additive became ineffective, the formation and above all growth of hydrate crystals are explosive and conduit blockage is rapid.

Example 3 (comparative)

Example 1 was repeated, with the exception that 0.1% by weight of a polyvinyl alcohol identified as being a hydrate nuclei promoter was added to the water, and hydrate formation was observed at 11.0° C. Regarding gas consumption, the first phase was non existent, the second phase corresponding to crystal growth and agglomeration was extremely rapid and complete blockage of the conduit occurred after 15 minutes of maximum consumption corresponding to 100% opening of the flow meter. In this case, the additive acted as a hydrate promoter as the formation temperature in its presence was higher than in the absence of additive (see Example 1). Since the number of nuclei was higher and no compound opposed their growth, the conduit blocked very rapidly.

Example 4

Example 1 was repeated, with the exception that 0.1% by weight of polyvinyl alcohol and 0.3% by weight of acrylamide-sodium acrylamidomethylpropanesulfonate copolymer were added to the water, and the observed hydrate formation temperature was 2.8° C. The gas consumption was in two phases. The first phase lasted about twenty minutes and the second phase occurred over an average duration of 75 minutes, the flow meter being about a third of its maximum capacity open with a gradual reduction in flow after about 50 minutes. In this case, growth of nuclei formed due to the nucleation promoter was immediately blocked by the growth inhibitor and was not accompanied by heat release, or by large gas consumption. The medium contained many very small crystals and the driving force of the system was thus substantially reduced. From 2.8° C. the medium was very depleted in growth inhibitor and a few crystals started to grow slowly, then agglomerated and blocked the conduit.

Example 5

Example 1 was repeated, with the exception that everything being the same except that an additive formulation was added to the water, said formulation containing 0.1% by weight of polyvinyl alcohol, 0.3% by weight of acrylamide-sodium acrylamidomethylpropanesulfonate copolymer and 0.45% by weight of ethylene oxide—propylene oxide copolymer obtained by condensing propylene oxide with one molecule of ethylene diamine followed by ethylene oxide condensation, this copolymer having a mass average molecular mass of 26000 and containing 80% by weight of ethylene oxide.

Under these conditions, the observed hydrate formation temperature was 2.6° C. As in the previous example, the gas consumption was in two distinct phases. The first phase was identical to that obtained in Example 4: for about twenty minutes, very low gas consumption was observed. The second phase was substantially longer and lasted 140 minutes. During the first 120 minutes of this second phase, the flow meter opening was constant and at about 20% of its capacity. The liquid flow rate was stable and the pressure drop was almost constant during this period. During the last 20 minutes, the flow became unstable. The pressure drops increased until it blocked.

Adding a hydrate dispersing compound to the "nucleation agent+growth inhibitor" mixture prolonged the test by more than two hours. When the quantities of growth inhibitor became insufficient to effectively block their growth, the crystals formed increased slowly, as the driving force of the system was low and, further, they did not agglomerate because of the action of the dispersing additive. They were thus transported in the form of a suspension of solid particles with a pressure drop and a flow rate which were constant for more than two hours.

Example 6

The same additive formulation as that used for Example 5 was employed, but the ethylene oxide-propylene oxide copolymer was replaced by an equivalent proportion of a composition prepared as described below (see Example 1 of European Patent application No. 905 125). 325 g of polymerized linseed oil (0.37 moles) expressed in triglyceride equivalents and with a viscosity of 10 Pa.s at 20° C. was introduced with 175 g of diethanolamine (1.66 moles) into a one liter flask provided with a mechanical stirrer and heated using an oil bath, under a nitrogen atmosphere. The corresponding composition of fatty acids and fatty acid oligomers of this polymerized linseed oil was as follows:

| | |
|---|---|
| fatty acid monomers | 48.8% |
| fatty acid dimers | 31.4% |
| fatty acid trimers | 13.0% |
| higher oligomers | 5.8% |

The acid index of the product was 10. The mixture was heated to 160° C. After 15 to 20 minutes of reaction at 160° C., the product became homogeneous and clear. This temperature was maintained at 160° C. for 100 minutes before cooling the mixture. The product was diluted in the reaction flask by introducing 500 g of an aromatic cut with a distillation range of 180° C. to 215° C. The mixture obtained was a yellow liquid, with a density of 950 kg/m$^3$ at 25° C., a viscosity of 0.212 Pa.s at 20° C., a flash point of more than 60° C. and a pour point of less than 20° C. The total time for this synthesis, including the heating time, was 2 to 3 hours.

Under these conditions, the observed hydrate formation temperature was 1.9° C. As in the preceding example, the gas consumption exhibited two distinct phases. The first phase was identical to that obtained in Example 4: for about twenty minutes, very low gas consumption was observed. The second phase was much longer and lasted 310 minutes. During the first 120 minutes of this second phase, the flow meter opening was constant and at about 20% of its capacity, then the gas consumption became substantially zero until the onset of the plugging process, which occurred after 170 minutes. The liquid flow rate was stable and the pressure drop was almost constant during this period.

Adding a hydrate dispersing compound to the "nucleation agent+growth inhibitor" mixture prolonged the test by more than 5 hours. When the quantities of growth inhibitor became insufficient to effectively block growth, the crystals formed grew slowly as the driving force of the system was low and, further, they did not agglomerate due to the action of the dispersing additive. They were then transported in the form of a suspension of solid particles with a pressure drop and flow rate which was constant for more than 5 hours.

Example 7

In this example, the formulation of Example 5 was used in which the ethylene oxide-propylene oxide copolymer was replaced by 0.5% by weight of a composition prepared as described below.

A polyisobutenylsuccinic anhydride containing a polyisobutenyl group with a number average molecular mass of close to 1000 was reacted with a polyethylene glycol with a molecular weight of about 400, in a molar proportion of 1/1, using a commercial aromatic hydrocarbon cut as the reaction medium. A solution of polyethyleneglycol polyisobutenylsuccinate in 50% solution by weight of active material was obtained.

The test was carried out using the same procedure as that given for the preceding examples. The results obtained are analogous to those obtained in Example 5.

The observations made in the tests reported in Examples 5, 6 and 7 show that adding a dispersing additive to the formulations of the invention can substantially prolong the agglomeration time of the hydrates by an amount on the efficiency of the additive under consideration.

Example 8

In this example, a deionized water and condensate medium was treated in proportions of 10/90 (% by volume). The additive formulation used comprises 0.1% by weight of polyvinyl alcohol, 0.3% by weight of acrylamide-sodium acrylamidomethylpropanesulfonate and 0.5% by weight of polyethyleneglycol polyisobutenylsuccinate as defined in Example 7.

The temperature of hydrate formation and the various phases observed are analogous to those obtained in Example 6, with the exception that, in the present case, no blockage of fluid circulation was observed in the test apparatus, even after 24 hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A composition for improving the transport of an oilfield effluent said composition comprising water, a hydrocarbon gas and optionally a liquid hydrocarbon phase, at least one agent in an effective amount to nucleate at least one hydrate crystal, and at least one component of a hydrate crystal growth inhibitor or a hydrate crystal dispersing agent.

2. A composition according to claim 1, comprising at least one hydrate crystal growth inhibitor.

3. A composition according to claim 1, at least one hydrate crystal growth inhibitor and at least one hydrate crystal dispersing agent.

4. A composition according to claim 1, wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups.

5. A composition according to claim 3, wherein said growth inhibitor is an associative water-soluble copolymer.

6. A composition according to claim 3, wherein said growth inhibitor is a water-soluble copolymer containing no heterocycle but possessing at least one sulfonate group.

7. A composition according to claim 3, wherein said growth inhibitor is a water-soluble copolymer wherein at least one of the constituting monomers thereof is a cationic monomer.

8. A composition according to claim 3, wherein said hydrate crystal dispersing agent is an amphiphilic compound soluble or dispersible in water.

9. A composition according to claim 8, wherein said hydrate crystal dispersing agent is a non-ionic amphiphilic compound.

10. A composition according to claim 8, wherein said hydrate crystal dispersing agent is a cationic amphiphilic compound.

11. A composition according to claim 8, wherein said hydrate crystal dispersing agent is an anionic amphiphilic compound.

12. A composition according to claim 8, wherein said hydrate crystal dispersing agent is an amphoteric amphiphilic compound.

13. A composition according to claim 3, wherein the additives are present in proportions of 5% to 50% of agent in an effective amount to nucleate at least one hydrate crystal, 5% to 50% of growth inhibitor and 5% to 50% hydrate crystal dispersing agent.

14. In a process for improving the transport of an oilfield effluent comprising water, a hydrocarbon gas and optionally a liquid hydrocarbon phase, said process comprising transporting said effluent under thermodynamic conditions where hydrates can form from the water and hydrocarbon gas, the improvement comprising adding to said effluent a formulation comprising at least one agent in an effective amount to nucleate at least one hydrate crystal, and at least one component of a hydrate crystal growth inhibitor or hydrate crystal dispersing agent.

15. A process according to claim 14, wherein said additive formulation is added to the fluid in a concentration of 0.05% to 5% by weight with respect to the amount of water present in said oilfield effluent.

16. A process according to claim 14, wherein said additive formulation is added to the fluid in a concentration of 0.2% to 2% by weight with respect to the amount of water present in said oilfield effluent.

17. A process according to claim 14, wherein, the amount of said agent in an effective amount to nucleate at least one hydrate crystal is at most 2% by weight, the amount of said growth inhibitor is at most 2% by weight and the amount of said dispersing agent is at most 1% by weight with respect to the water present in said oilfield effluent.

18. A process according to claim 14, wherein, characterized in the amount of said agent in an effective amount to nucleate at least one hydrate crystal is at most 0.5% by weight, the amount of said growth inhibitor is at most 1% by weight and the amount of said dispersing agent is at most 0.5% by weight with respect to the water present in said oilfield effluent.

19. A process according to claim 14, wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups, wherein said growth inhibitor is a water-soluble copolymer containing no heterocycle but possessing at least one sulfonate group or wherein at least one of the constituting monomers thereof is a cationic monomer, and said hydrate crystal dispersing agent is a non-ionic amphiphilic compound.

20. A formulation according to claim 3, wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups, wherein said growth inhibitor is a water-soluble copolymer containing no heterocycle but possessing at least one sulfonate group or wherein at least one of the constituting monomers thereof is a cationic monomer, and said hydrate crystal dispersing agent is a non-ionic amphiphilic compound.

21. A composition according to claim 1, comprising at least one hydrate crystal dispersing agent.

22. A process according to claim 14, wherein the formulation comprises at least one hydrate crystal growth inhibitor.

23. A process according to claim 14, wherein the formulation comprises at least one hydrate crystal dispersing agent.

24. A process according to claim 14, wherein the formulation comprises at least one hydrate crystal growth inhibitor and at least one hydrate crystal dispersing agent.

25. A composition according to claim 1, wherein the at least one agent in an effective amount to nucleate at least one hydrate crystal is present at most 2% by weight with respect to the water present in the oilfield effluent.

26. A composition according to claim 1, wherein the at least one agent in an effective amount to nucleate at least one hydrate crystal is present at most 0.5% by weight with respect to the water present in the oilfield effluent.

27. A formulation for improving the transport of an oilfield effluent comprising at least one agent in an effective amount to nucleate at least one hydrate crystal, at least one hydrate crystal growth inhibitor and at least one hydrate crystal dispersing agent.

28. A formulation according to claim 27 wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups.

29. A formulation according to claim 27 wherein said growth inhibitor is an associative water-soluble copolymer.

30. A formulation according to claim 27 wherein said growth inhibitor is a water-soluble copolymer containing no heterocycle but possessing at least one sulfonate group.

31. A formulation according to claim 27 wherein said growth inhibitor is a water-soluble copolymer wherein at least one of the constituting monomers thereof is a cationic monomer.

32. A formulation according to claim 27, wherein said hydrate crystal dispersing agent is an amphiphilic compound soluble or dispersible in water.

33. A formulation according to claim 27, wherein said hydrate crystal dispersing agent is a non-ionic amphiphilic compound.

34. A formulation according to claim 27, wherein said hydrate crystal dispersing agent is a cationic amphiphilic compound.

35. A formulation according to claim 27, wherein said hydrate crystal dispersing agent is an anionic amphiphilic compound.

36. A formulation according to claim 27, wherein said hydrate crystal dispersing agent is an amphoteric amphiphilic compound.

37. A formulation according to claim 27, wherein the additives are present in proportions of 5% to 50% of agent in an effective amount to nucleate at least one hydrate crystal, 5% to 50% of growth inhibitor and 5% to 50% hydrate crystal dispersing agent.

38. A formulation according to claim 27, wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups, wherein said growth inhibitor is a water-soluble copolymer containing no heterocycle but possessing at least one sulfonate group or wherein at least one of the constituting monomers thereof is a cationic monomer, and said hydrate crystal dispersing agent is a non-ionic amphiphilic compound.

39. In a process for improving the transport of an oilfield effluent comprising water, a hydrocarbon gas and optionally a liquid hydrocarbon phase, said process comprising transporting said effluent under thermodynamic conditions where hydrates can form from the water and hydrocarbon gas, the improvement comprising adding to said effluent a formulation according to claim 27.

40. A process according to claim 39, wherein said formulation is added to the effluent in a concentration of 0.05% to 5% by weight with respect to the amount of water present in said oilfield effluent.

41. A process according to claim 39, wherein said formulation is added to the effluent in a concentration of 0.2% to 2% by weight with respect to the amount of water present in said oilfield effluent.

42. A process according to claim 39, wherein, the amount of said agent in an effective amount to nucleate at least one hydrate crystal is at most 0.5% by weight, the amount of said growth inhibitor is at most 1% by weight and the amount of said dispersing agent is at most 0.5% by weight with respect to the water present in said oilfield effluent.

43. A process according to claim 39, wherein said agent in an effective amount to nucleate at least one hydrate crystal is a water-soluble alcohol, polyol, quaternary phosphonium salt, or a polymer or copolymer wherein at least one constituting monomers thereof possesses one or more hydroxyl groups, wherein said growth inhibitor is a water-soluble copolymer containing no heterocycle but possessing at least one sulfonate group or wherein at least one of the constituting monomers thereof is a cationic monomer, and said hydrate crystal dispersing agent is a non-ionic amphiphilic compound.

44. A formulation for improving the transport of an oilfield effluent consisting essentially of at least one agent in an effective amount to nucleate at least one hydrate crystal, and at least one component of a hydrate crystal growth inhibitor or a hydrate crystal dispersing agent.

45. A formulation comprising at least one agent in an effective amount to nucleate at least one hydrate crystal, and at least one component of a hydrate crystal growth inhibitor or a hydrate crystal dispersing agent.

* * * * *